(12) United States Patent
Shinkawa

(10) Patent No.: US 12,451,522 B2
(45) Date of Patent: Oct. 21, 2025

(54) SECONDARY BATTERY, ELECTRONIC DEVICE, AND POWER TOOL

(71) Applicant: MURATA MANUFACTURING CO., LTD., Kyoto (JP)

(72) Inventor: Akira Shinkawa, Kyoto (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 587 days.

(21) Appl. No.: 17/881,976

(22) Filed: Aug. 5, 2022

(65) Prior Publication Data

US 2022/0393253 A1 Dec. 8, 2022

Related U.S. Application Data

(63) Continuation of application No. PCT/JP2021/009420, filed on Mar. 10, 2021.

(30) Foreign Application Priority Data

Mar. 19, 2020 (JP) ................... 2020-049176

(51) Int. Cl.
*H01M 10/0587* (2010.01)
*H01M 4/66* (2006.01)
(Continued)

(52) U.S. Cl.
CPC ....... *H01M 10/0587* (2013.01); *H01M 4/662* (2013.01); *H01M 50/531* (2021.01); *H01M 2004/021* (2013.01); *H01M 2220/30* (2013.01)

(58) Field of Classification Search
CPC ............. H01M 10/0587; H01M 4/662; H01M 50/531; H01M 2004/021; H01M 2220/30;
(Continued)

(56) References Cited

U.S. PATENT DOCUMENTS

| 2004/0131930 A1* | 7/2004 | Nakanishi ......... H01M 10/0587 |
| 2010/0104945 A1* | 4/2010 | Kozuki ............. H01M 10/0431 429/246 |

(Continued)

FOREIGN PATENT DOCUMENTS

| DE | 60221181 | 4/2008 |
| DE | 102017006229 A1 * | 1/2019 ......... B23K 26/0876 |

(Continued)

OTHER PUBLICATIONS

JP-2007335156-A Translated (Year: 2007).*

(Continued)

*Primary Examiner* — Matthew T Martin
*Assistant Examiner* — Kevin Song
(74) *Attorney, Agent, or Firm* — K&L Gates LLP

(57) ABSTRACT

Disclosed is a secondary battery in which a positive electrode active material non-covered portion is joined to a positive electrode current collector plate at one end portion of an electrode winding body, a negative electrode active material non-covered portion is joined to a negative electrode current collector plate at the other end portion of the electrode winding body, the positive electrode current collector plate has a positive electrode bead on a surface thereof, the negative electrode current collector plate has a negative electrode bead on a surface thereof, a width of the positive electrode bead is 0.05 mm or more and 0.18 mm or less, a width of the negative electrode bead is 0.03 mm or more and 0.12 mm or less.

5 Claims, 10 Drawing Sheets

(51) Int. Cl.
    *H01M 50/531* (2021.01)
    *H01M 4/02* (2006.01)
(58) Field of Classification Search
    CPC .... H01M 4/661; H01M 4/70; H01M 10/0431; H01M 10/052; H01M 10/0525; H01M 50/107; H01M 50/533; H01M 50/534; H01M 50/536; H01M 50/538; H01M 10/04; Y02E 60/10; Y02P 70/50
    See application file for complete search history.

(56) References Cited

U.S. PATENT DOCUMENTS

| | | | |
|---|---|---|---|
| 2016/0226056 | A1 | 8/2016 | Masson et al. |
| 2022/0149443 | A1 | 5/2022 | Otani |

FOREIGN PATENT DOCUMENTS

| | | | |
|---|---|---|---|
| JP | 2004095487 | | 3/2004 |
| JP | 2007335156 A | * | 12/2007 |
| JP | 2008166030 A | | 7/2008 |
| JP | 2011129328 A | | 6/2011 |
| JP | 2015106614 A | | 6/2015 |
| JP | 2016532990 A | | 10/2016 |
| JP | 2019061949 A | | 4/2019 |
| WO | 2021020277 A1 | | 2/2021 |

OTHER PUBLICATIONS

DE-102017006229-A1 Translated (Year: 2019).*
Chinese Office Action issued Nov. 18, 2023 in corresponding Chinese Application No. 202180021922.9.
International Search Report of corresponding PCT application PCT/JP2021/009420, dated May 18, 2021.
Chinese Office Action issued Jul. 19, 2024 in corresponding Chinese Application No. 202180021922.9.
German Office Action issued Feb. 25, 2025 in corresponding German Application No. 11 2021 001 714.4.

* cited by examiner

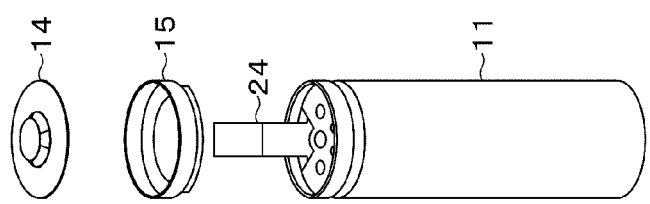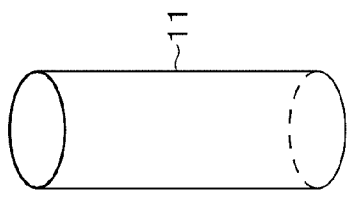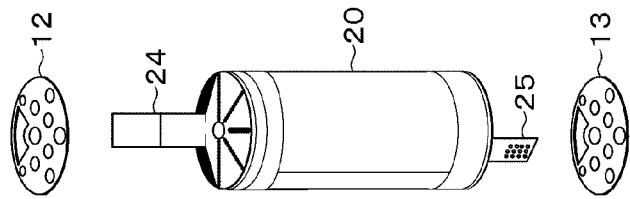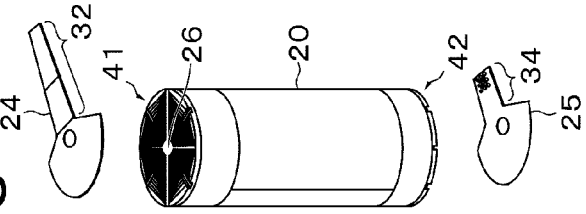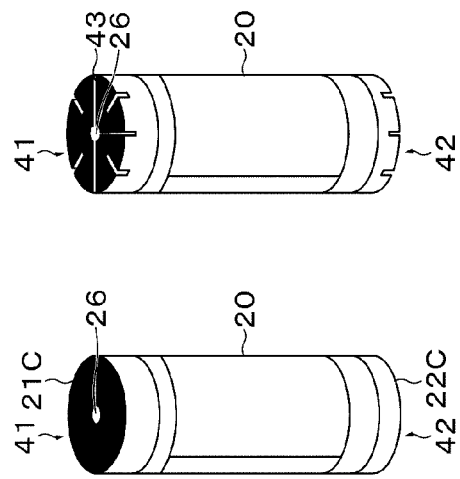

SECONDARY BATTERY, ELECTRONIC DEVICE, AND POWER TOOL

CROSS REFERENCE TO RELATED APPLICATIONS

The present application is a continuation of PCT patent application no. PCT/JP2021/009420, filed on Mar. 10, 2021, which claims priority to Japanese patent application no. JP 2020-049176, filed on Mar. 19, 2020, the entire contents of which are being incorporated herein by reference.

BACKGROUND

The present application relates to a secondary battery, an electronic device, and a power tool.

Lithium ion batteries have been developed for applications requiring high output such as power tools and electric vehicles. Examples of one method for achieving high output include high rate discharge in which a relatively large current flows from a battery.

For example, in order to produce a battery having low internal resistance, a technique has been described that an active material non-covered portion at an end portion of an electrode winding body is bent, and a surface of a current collector plate disposed on the end portion is irradiated with a laser to join the active material non-covered portion and the current collector plate.

SUMMARY

The present application relates to a secondary battery, an electronic device, and a power tool.

In the technique described in the Background section, there is a problem that the internal resistance of the battery is not sufficiently lowered due to welding failure.

Therefore, the present application relates to providing a battery which is suitable for high rate discharge and has low internal resistance according to an embodiment.

In order to solve the above-described problems, the present application provides, in an embodiment, a secondary battery in which an electrode winding body having a structure in which a strip-shaped positive electrode and a strip-shaped negative electrode are stacked with a separator interposed therebetween and wound around a central axis, a positive electrode current collector plate, and a negative electrode current collector plate are housed in a battery can,
  the positive electrode having a positive electrode active material covered portion covered with a positive electrode active material layer and a positive electrode active material non-covered portion on a strip-shaped positive electrode foil,
  the negative electrode having a negative electrode active material covered portion covered with a negative electrode active material layer and a negative electrode active material non-covered portion on a strip-shaped negative electrode foil,
  the positive electrode active material non-covered portion being joined to the positive electrode current collector plate at one end portion of the electrode winding body,
  the negative electrode active material non-covered portion being joined to the negative electrode current collector plate at the other end portion of the electrode winding body,
  the electrode winding body having a flat surface formed by bending any one or both of the positive electrode active material non-covered portion and the negative electrode active material non-covered portion toward a central axis of the wound structure and overlapping the positive electrode active material non-covered portion and the negative electrode active material non-covered portion, and a groove formed in the flat surface,
  the positive electrode current collector plate having a positive electrode bead on a surface thereof, the negative electrode current collector plate having a negative electrode bead on a surface thereof,
  a width of the positive electrode bead being 0.05 mm or more and 0.18 mm or less, a width of the negative electrode bead being 0.03 mm or more and 0.12 mm or less,
  a thickness of the positive electrode current collector plate being 0.07 mm or more and 0.20 mm or less, a thickness of the negative electrode current collector plate being 0.05 mm or more and 0.15 mm or less,
  a thickness of the positive electrode active material non-covered portion being 5 µm or more and 20 µm or less, a thickness of the negative electrode active material non-covered portion being 6 µm or more and 20 µm or less, and
  the number of the positive electrode active material non-covered portions overlapping on a positive electrode side being 2 or more, and the number of the negative electrode active material non-covered portions overlapping on a negative electrode side being 2 or more.

According to an embodiment of the present application, it is possible to provide a battery which is suitable for high rate discharge and has low internal resistance. The contents of the present application should not be interpreted as being limited by the effects exemplified herein.

BRIEF DESCRIPTION OF THE FIGURES

FIGS. 4A to 4F are views for explaining an assembly process of the battery according to an embodiment.

DETAILED DESCRIPTION

Hereinafter, the present application will be described in further detail including with reference to the drawings.

The present application described herein includes preferred specific and the contents of the present application are not limited thereto.

In an embodiment of the present application, a cylindrical lithium ion battery will be described as an example of the secondary battery.

Figure 1:
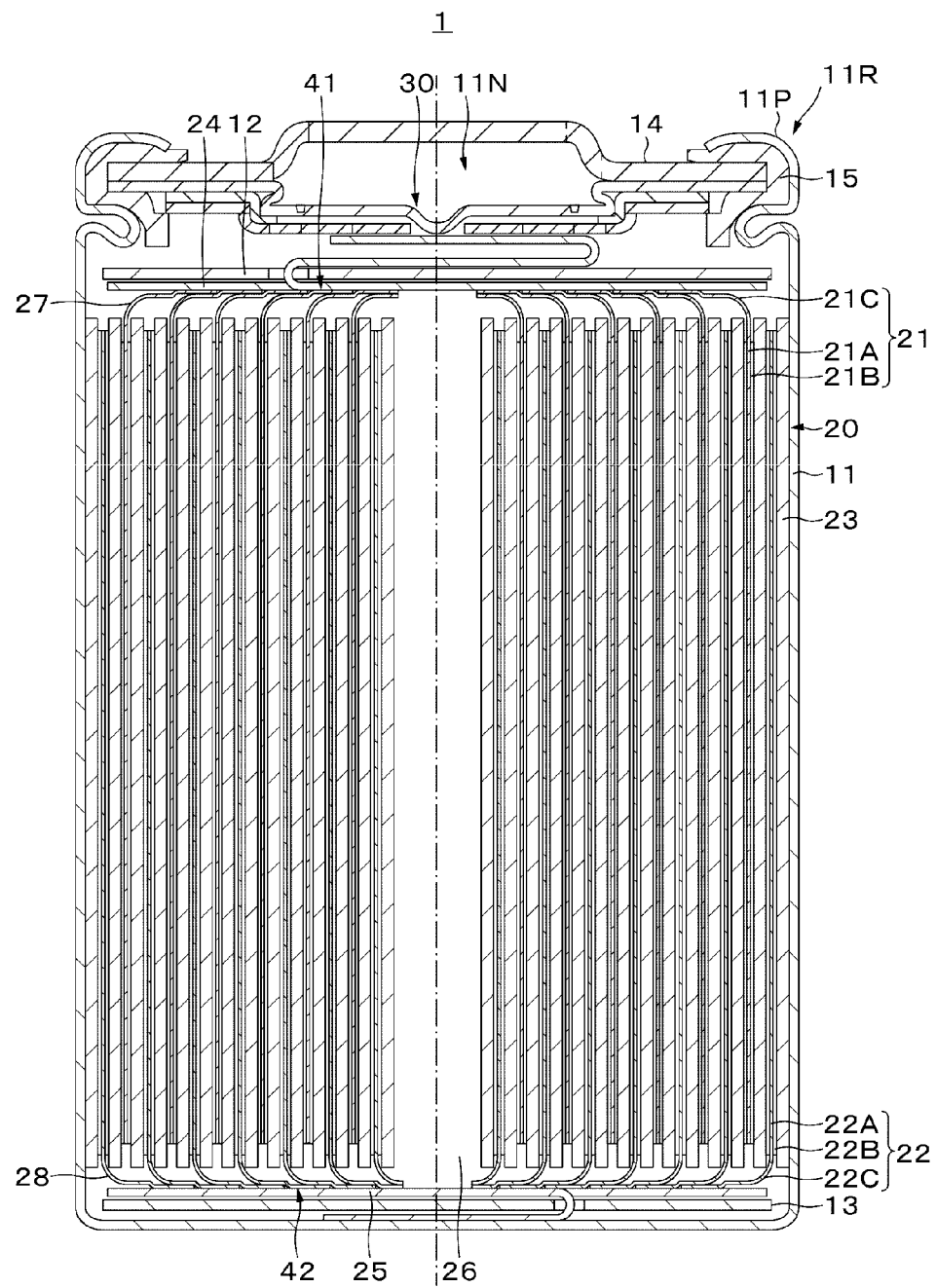
FIG. 1 is a sectional view of a battery according to an embodiment.

First, a whole configuration of the lithium ion battery will be described. FIG. 1 is a schematic sectional view of a lithium ion battery 1. For example, as illustrated in FIG. 1, the lithium ion battery 1 is a cylindrical lithium ion battery containing an electrode winding body 20 inside a battery can 11.

Specifically, the lithium ion battery 1 includes, for example, a pair of insulating plates 12 and 13 and the electrode winding body 20 inside the cylindrical battery can 11. However, the lithium ion battery 1 may further include, for example, one or two or more of a positive temperature coefficient (PTC) element, a reinforcing member, and the like inside the battery can 11.

The battery can 11 is a member that mainly houses the electrode winding body 20. The battery can 11 is, for example, a cylindrical vessel having one end surface opened and the other end surface closed. That is, the battery can 11 has an open end surface (open end surface 11N). The battery can 11 contains, for example, one or two or more of metal materials such as iron, aluminum and their alloys. However, one or two or more of metal materials such as nickel may be plated on the surface of the battery can 11, for example.

The insulating plates 12 and 13 are dish-shaped plates having a surface substantially perpendicular to a winding axis (Z axis in FIG. 1) of the electrode winding body 20. Furthermore, the insulating plates 12 and 13 are arranged to sandwich the electrode winding body 20 between them, for example.

At the open end surface 11N of the battery can 11, the battery lid 14 and the safety valve mechanism 30 are crimped with the gasket 15 interposed therebetween, and a crimped structure 11R (crimped structure) is formed. Consequently, the battery can 11 is hermetically sealed in a state in which the electrode winding body 20 and the like are housed inside the battery can 11.

The battery lid 14 is a member that mainly closes the open end surface 11N of the battery can 11 in the state in which the electrode winding body 20 and the like are housed inside the battery can 11. The battery lid 14 contains, for example, a material similar to a material for forming the battery can 11. A central region of the battery lid 14 protrudes, for example, in a +Z direction. Thus, a region (peripheral region) other than the central region of the battery lid 14 is in contact with, for example, the safety valve mechanism 30.

The gasket 15 is a member that mainly seals a gap between the bent portion 11P and the battery lid 14 by being interposed between the battery can 11 (bent portion 11P) and the battery lid 14. However, a surface of the gasket 15 may be coated with asphalt or the like, for example.

The gasket 15 contains, for example, one or two or more of insulating materials. The type of insulating material is not particularly limited, and is, for example, a polymeric material such as polybutylene terephthalate (PBT) and polypropylene (PP). Particularly, the insulating material is preferably polybutylene terephthalate. This is because the gap between the bent portion 11P and the battery lid 14 is sufficiently sealed while the battery can 11 and the battery lid 14 are electrically separated from each other.

When pressure (internal pressure) inside the battery can 11 rises, the safety valve mechanism 30 mainly releases the internal pressure by releasing the hermetically sealed state of the battery can 11 as necessary. The cause of the increase in the internal pressure of the battery can 11 is, for example, a gas generated due to a decomposition reaction of an electrolytic solution during charge and discharge.

In the cylindrical lithium ion battery, a strip-shaped positive electrode 21 and a strip-shaped negative electrode 22 are spirally wound with the separator 23 interposed therebetween, and are accommodated in the battery can 11 in a state of being impregnated with the electrolytic solution. The positive electrode 21 is obtained by forming a positive electrode active material layer on one surface or both surfaces of a positive electrode foil 21A, and a material of the positive electrode foil 21A is, for example, a metal foil made of aluminum or an aluminum alloy. The negative electrode 22 is obtained by forming a negative electrode active material layer on one surface or both surfaces of a negative electrode foil 22A, and a material of the negative electrode foil 22A is, for example, a metal foil made of nickel, a nickel alloy, copper, or a copper alloy. The separator 23 is a porous and insulating film, and enables movement of substances such as ions and an electrolytic solution while electrically insulating the positive electrode 21 and the negative electrode 22.

Although the positive electrode active material layer and the negative electrode active material layer cover many portions of the positive electrode foil 21A and the negative electrode foil 22A, respectively, neither of the active material layers intentionally covers a periphery of one end in a transverse direction of the strip. Hereinafter, the portions not covered with the active material layer will be appropriately referred to as active material non-covered portions 21C and 22C, and the portions covered with the active material layer will be appropriately referred to as active material covered portions 21B and 22B. In the cylindrical battery, the electrode winding body 20 is wound in such a manner that an active material non-covered portion 21C of the positive electrode and an active material non-covered portion 22C of the negative electrode are overlapped each other with the separator 23 interposed therebetween so as to face in opposite directions.

Figure 2:
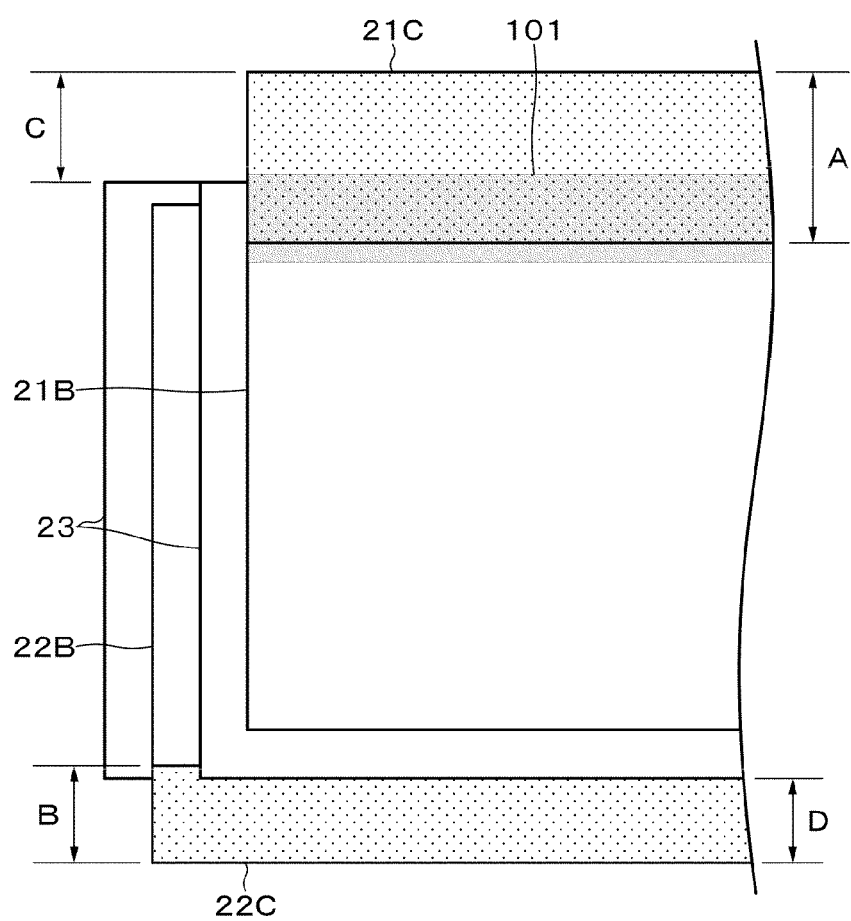
FIG. 2 is a view for explaining an example of an arrangement relationship between a positive electrode, a negative electrode, and a separator in an electrode winding body.

FIG. 2 shows an example of a structure before winding in which the positive electrode 21, the negative electrode 22, and the separator 23 are stacked. A width of the active material non-covered portion 21C (upper hatched portion in FIG. 2) of the positive electrode is A, and a width of the active material non-covered portion 22C (lower hatched portion in FIG. 2) of the negative electrode is B. In an embodiment, A>B is preferable, for example, A=7 (mm) and B=4 (mm). A length of a portion where the active material non-covered portion 21C of the positive electrode protrudes from one end of the separator 23 in the width direction is C, and a length of a portion where the active material non-covered portion 22C of the negative electrode protrudes from the other end of the separator 23 in the width direction is D. In an embodiment, C>D is preferable, for example, C=4.5 (mm) and D=3 (mm).

The active material non-covered portion 21C of the positive electrode is formed from, for example, aluminum and the like, and the active material non-covered portion 22C of the negative electrode is formed from, for example, copper and the like; therefore, in general, the active material non-covered portion 21C of the positive electrode is softer (has a lower Young's modulus) than the active material non-covered portion 22C of the negative electrode. Thus, in an embodiment, A>B and C>D are more preferable, and in this case, when the active material non-covered portion 21C of the positive electrode and the active material non-covered portion 22C of the negative electrode are simultaneously bent at the same pressure from both electrode sides, a height of the bent portion measured from a tip of the separator 23 may be substantially the same between the positive electrode 21 and the negative electrode 22. At this time, since the active material non-covered portions 21C and 22C are bent and suitably overlap each other, the active material non-covered portions 21C and 22C and current collector plates 24 and 25 can be easily joined by laser welding. Although joining in an embodiment means electrical connection, the joining method is not limited to laser welding.

In the positive electrode 21, a section having a width of 3 mm and including a boundary between the active material non-covered portion 21C and the active material covered portion 21B is covered with an insulating layer 101 (gray region portion in FIG. 2). The entire region of the active material non-covered portion 21C of the positive electrode facing the active material covered portion 22B of the negative electrode with the separator interposed therebetween is covered with the insulating layer 101. The insulating layer 101 has an effect of reliably preventing an internal short circuit of the battery 1 when a foreign matter enters between the active material covered portion 22B of the negative electrode and the active material non-covered portion 21C of the positive electrode. In addition, the insulating layer 101 has an effect of absorbing an impact when the impact is applied to the battery 1 and reliably preventing the active material non-covered portion 21C of the positive electrode from being bent or being short-circuited to the negative electrode 22.

A through hole 26 is formed in a central axis of the electrode winding body 20. The through hole 26 is a hole into which a winding core for assembling the electrode winding body 20 and an electrode rod for welding are inserted. Since the electrode winding body 20 is wound in an overlapping manner such that the active material non-covered portion 21C of the positive electrode and the active material non-covered portion 22C of the negative electrode face in opposite directions, the active material non-covered portion 21C of the positive electrode gathers on one end surface (end surface 41) of the electrode winding body, and the active material non-covered portion 22C of the negative electrode gathers on the other end surface (end surface 42) of the electrode winding body 20. In order to improve contact with the current collector plates 24 and 25 for extracting current, the active material non-covered portions 21C and 22C are bent, and the end surfaces 41 and 42 are flat surfaces. The bending direction is a direction from outer edge portions 27 and 28 of the end surfaces 41 and 42 toward the through hole 26, and the active material non-covered portions of adjacent peripheries overlap each other and are bent in a wound state. In the present specification, the "flat surface" includes not only an absolutely flat surface but also a surface having some unevenness and surface roughness to the extent that the active material non-covered portion and the current collector plate can be joined.

When the active material non-covered portions 21C and 22C are bent so as to overlap each other, at first it appears that the end surfaces 41 and 42 can be made flat; however, if no processing is performed before bending, wrinkles or voids (spaces) are generated in the end surfaces 41 and 42 at the time of bending, and the end surfaces 41 and 42 do not become flat surfaces. Here, "wrinkles" and "voids" are portions where unevenness occurs in the bent active material non-covered portions 21C and 22C, and the end surfaces 41 and 42 do not become flat surfaces. In order to prevent the occurrence of wrinkles and voids, a groove 43 (see, for example, FIG. 4B) is formed in advance in a radial direction from the through hole 26. The groove 43 extends from the outer edge portions 27 and 28 of the end surfaces 41 and 42 to the through hole 26. The through hole 26 is provided at the center of the electrode winding body 20, and the through hole 26 is used as a hole into which a welding tool is inserted in an assembly process of the lithium ion battery 1. The active material non-covered portions 21C and 22C at the start of winding of the positive electrode 21 and the negative electrode 22 near the through hole 26 have cut-outs. This is to prevent the through hole 26 from being closed at the time of bending toward the through hole 26. The groove 43 remains in the flat surface after the active material non-covered portions 21C and 22C are bent, and a portion without the groove 43 is joined (welded or the like) to the positive electrode current collector plate 24 or the negative electrode current collector plate 25. Not only the flat surface but also the groove 43 may be joined to a part of the current collector plates 24 and 25.

A detailed configuration of the electrode winding body 20, that is, detailed configurations of the positive electrode 21, the negative electrode 22, the separator 23, and the electrolytic solution will be described later.

In a normal lithium ion battery, for example, a lead for current extraction is welded to each one portion of the positive electrode and the negative electrode; however, this is not suitable for high rate discharge because the internal resistance of the battery is large, and the lithium ion battery generates heat and becomes high temperature during discharge. Thus, in the lithium ion battery of an embodiment, the positive electrode current collector plate 24 and the negative electrode current collector plate 25 are arranged on the end surfaces 41 and 42, and are welded to the active material non-covered portions 21C and 22C of the positive electrode and the negative electrode present on the end surfaces 41 and 42 at multiple points, thereby suppressing the internal resistance of the battery to be low. The end surfaces 41 and 42 being bent to be flat surfaces also contributes to the reduction in resistance.

Figure 3A:
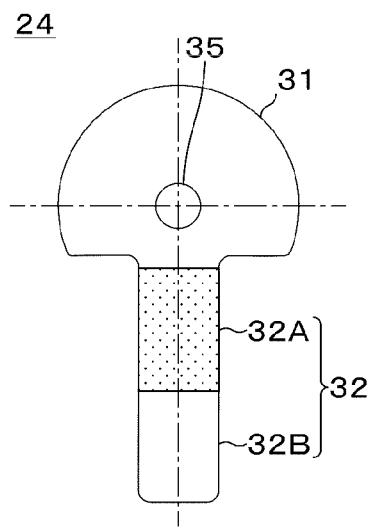
FIG. 3A is a plan view of a positive electrode current collector plate.
Figure 3B:
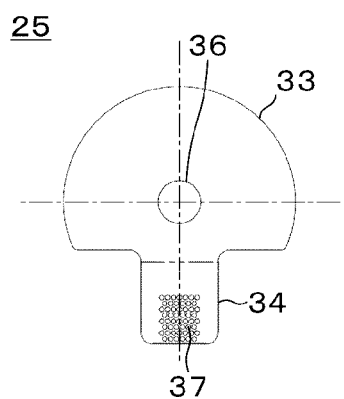
FIG. 3B is a plan view of a negative electrode current collector plate.

FIGS. 3A and 3B show an example of the current collector plate. FIG. 3A shows the positive electrode current collector plate 24, and FIG. 3B shows the negative electrode current collector plate 25. The material of the positive electrode current collector plate 24 is, for example, a metal plate made of a simple substance or a composite of aluminum or an aluminum alloy, and the material of the negative electrode current collector plate 25 is, for example, a metal plate made of a simple substance or a composite (clad material) of nickel, a nickel alloy, copper, or a copper alloy. As shown in FIG. 3A, the positive electrode current collector plate 24 has a shape in which a rectangular strip-shaped portion 32 is attached to a plate-shaped portion 31 having a flat fan shape. A hole 35 is formed near the center of the plate-shaped portion 31, and the position of the hole 35 is a position corresponding to the through hole 26.

A portion indicated by shaded lines in FIG. 3A is an insulating portion 32A in which an insulating tape is attached to the strip-shaped portion 32 or an insulating material is applied, and a portion below the shade portion in the drawing is a connecting portion 32B to a sealing plate also serving as an external terminal. In the case of a battery structure in which a metal center pin (not shown) is not provided in the through hole 26, there is a low possibility that the strip-shaped portion 32 comes into contact with a portion having a negative electrode potential, and therefore, the insulating portion 32A may not be provided. In this case, a width between the positive electrode 21 and the negative electrode 22 can be increased by an amount corresponding to a thickness of the insulating portion 32A to increase a charge/discharge capacity.

The negative electrode current collector plate 25 has substantially the same shape as the positive electrode current collector plate 24, but has a different strip-shaped portion.

The strip-shaped portion 34 of the negative electrode current collector plate in FIG. 3B is shorter than the strip-shaped portion 32 of the positive electrode current collector plate, and has no portion corresponding to the insulating portion 32A. The strip-shaped portion 34 includes a circular protrusion (projection) 37 indicated by a plurality of circles. During resistance welding, current is concentrated on the protrusion, and the protrusion is melted to weld the strip-shaped portion 34 to a bottom of the battery can 11. Similarly to the positive electrode current collector plate 24, in the negative electrode current collector plate 25, a hole 36 is formed near the center of a plate-shaped portion 33, and the position of the hole 36 is a position corresponding to the through hole 26. The plate-shaped portion 31 of the positive electrode current collector plate 24 and the plate-shaped portion 33 of the negative electrode current collector plate 25 have a fan shape, and thus cover a part of the end surfaces 41 and 42. The reason for not covering the whole is to allow the electrolytic solution to smoothly permeate the electrode winding body when the battery is assembled, or to easily release gas generated when the battery is in an abnormally high temperature state or an overcharged state to the outside of the battery.

The positive electrode active material layer contains at least a positive electrode material (positive electrode active material) capable of occluding and releasing lithium, and may further contain a positive electrode binder, a positive electrode conductive agent, and the like. The positive electrode material is preferably a lithium-containing composite oxide or a lithium-containing phosphate compound. The lithium-containing composite oxide has, for example, a layered rock salt-type or spinel-type crystal structure. The lithium-containing phosphate compound has, for example, an olivine type crystal structure.

The positive electrode binder contains synthetic rubber or a polymer compound. The synthetic rubber includes styrene-butadiene-based rubber, fluororubber, ethylene propylene diene, and the like. The polymer compounds include polyvinylidene fluoride (PVdF), polyimide, and the like.

The positive electrode conductive agent is a carbon material such as graphite, carbon black, acetylene black, or Ketjen black. However, the positive electrode conductive agent may be a metal material and a conductive polymer.

The thickness of the positive electrode foil 21A is preferably 5 µm or more and 20 µm or less. This is because, if the thickness of the positive electrode foil 21A is 5 µm or more, the positive electrode 21 can be produced without being broken when the positive electrode 21, the negative electrode 22, and the separator 23 are wound in an overlapping manner. This is because, when the thickness of the positive electrode foil 21A is 20 µm or less, a decrease in energy density of the battery 1 can be prevented, and a facing area between the positive electrode 21 and the negative electrode 22 increases, so that the battery 1 having a large output can be obtained.

A surface of the negative electrode foil 22A is preferably roughened for improving close-contact characteristics with the negative electrode active material layer. The negative electrode active material layer contains at least a negative electrode material (negative electrode active material) capable of occluding and releasing lithium, and may further contain a negative electrode binder, a negative electrode conductive agent, and the like.

The negative electrode material contains, for example, a carbon material. The carbon material is easily graphitizable carbon, non-graphitizable carbon, graphite, low crystalline carbon, or amorphous carbon. The shape of the carbon material is fibrous, spherical, granular, or scaly.

The negative electrode material contains, for example, a metal-based material. Examples of the metal-based material include Li (lithium), Si (silicon), Sn (tin), Al (aluminum), Zr (zinc), and Ti (titanium). The metal-based element forms a compound, a mixture, or an alloy with another element, and examples thereof include silicon oxide ($SiO_x$ ($0<x\leq2$)), silicon carbide (SiC), an alloy of carbon and silicon, and lithium titanate (LTO).

The thickness of the negative electrode foil 22A is preferably 5 µm or more and 20 µm or less. This is because, if the thickness of the negative electrode foil 22A is 5 µm or more, the negative electrode 22 can be produced without being broken when the positive electrode 21, the negative electrode 22, and the separator 23 are wound in an overlapping manner. This is because, when the thickness of the negative electrode foil 22A is 20 µm or less, the decrease in energy density of the battery 1 can be prevented, and the facing area between the positive electrode 21 and the negative electrode 22 increases, so that the battery 1 having a large output can be obtained.

The separator 23 is a porous film containing a resin, and may be a stacked film of two or more kinds of porous films. Examples of the resin include polypropylene and polyethylene. The separator 23 may include a resin layer on one side or both sides of a porous membrane as a substrate layer. The reason for this is that, this allows for an improvement in close-contact characteristics of the separator 23 with respect to each of the positive electrode 21 and the negative electrode 22, thereby suppressing distortion of the electrode winding body 20.

The resin layer contains a resin such as PVdF. When the resin layer is formed, the base material layer is coated with a solution prepared by dissolving the resin in an organic solvent, and thereafter, the substrate layer is dried. Alternatively, the base material layer may be immersed in the solution, and thereafter the substrate layer may be dried. The resin layer preferably contains inorganic particles or organic particles from the viewpoint of improving heat resistance and safety of the battery. The type of the inorganic particles is aluminum oxide, aluminum nitride, aluminum hydroxide, magnesium hydroxide, boehmite, talc, silica, mica, or the like. In place of the resin layer, a surface layer formed by a sputtering method, an ALD (atomic layer deposition) method, and other methods and mainly composed of inorganic particles may be used.

The thickness of the separator 23 is preferably 4 µm or more and 30 µm or less. When the thickness of the separator is 4 µm or more, it is possible to prevent an internal short circuit due to contact between the positive electrode 21 and the negative electrode 22 facing each other with the separator 23 interposed therebetween. When the thickness of the separator 23 is 30 µm or less, lithium ions and an electrolytic solution can easily pass through the separator 23, and during winding, an electrode density of the positive electrode 21 and the negative electrode 22 can be increased.

The electrolytic solution contains a solvent and an electrolyte salt, and may further contain an additive and the like as necessary. The solvent is a non-aqueous solvent such as an organic solvent, or water. An electrolytic solution containing a non-aqueous solvent is referred to as a non-aqueous electrolytic solution. The non-aqueous solvent is a cyclic carbonate ester, a chain carbonate ester, lactone, a chain carboxylic ester, or nitrile (mononitrile).

Although a representative example of the electrolyte salt is a lithium salt, a salt other than the lithium salt may be contained. Examples of the lithium salt include lithium hexafluorophosphate ($LiPF_6$), lithium tetrafluoroborate ($LiBF_4$), lithium perchlorate ($LiClO_4$), lithium methanesulfonate ($LiCH_3SO_3$), lithium trifluoromethanesulfonate ($LiCF_3SO_3$), and dilithium hexafluorosilicate ($Li_2SF_6$). These salts may be used in mixture, and among them, it is preferable to use $LiPF_6$ and $LiBF_4$ in mixture from the viewpoint of improving battery characteristics. The content of the electrolyte salt is not particularly limited, and is preferably from 0.3 mol/kg to 3 mol/kg with respect to the solvent.

A method for producing the lithium ion battery 1 of an embodiment will be described with reference to FIGS. 4A to 4F. First, the positive electrode active material was applied and attached to a surface of the strip-shaped positive electrode foil 21A to form a covered portion of the positive electrode 21, and the negative electrode active material was applied to a surface of the strip-shaped negative electrode foil 22A to form a covered portion of the negative electrode 22. At this time, the active material non-covered portions 21C and 22C not applied and attached with the positive electrode active material and the negative electrode active material were produced at one end in a transverse direction of the positive electrode 21 and one end in a transverse direction of the negative electrode 22. A cut-out was formed in a part of the active material non-covered portions 21C and 22C, the part corresponding to the winding start at the time of winding. Steps such as drying were performed on the positive electrode 21 and the negative electrode 22. The active material non-covered portion 21C of the positive electrode and the active material non-covered portion 22C of the negative electrode were overlapped with the separator 23 interposed therebetween so as to be in opposite directions, and wound in a spiral shape so as to form the through hole 26 in the central axis and to dispose the formed cut-out near the central axis, thereby producing the electrode winding body 20 as shown in FIG. 4A.

Next, as shown in FIG. 4B, by perpendicularly pressing an end of a thin flat plate (for example, a thickness of 0.5 mm) or the like against the end surfaces 41 and 42, the groove 43 was produced in a part of the end surface 41 and the end surface 42. In this way, the groove 43 extending radially from the through hole 26 was produced. The number and arrangement of the grooves 43 shown in FIG. 4B are merely examples. As shown in FIG. 4C, the same pressure was simultaneously applied from both electrode sides in a direction substantially perpendicular to the end surfaces 41 and 42, and the active material non-covered portion 21C of the positive electrode and the active material non-covered portion 22C of the negative electrode were bent to form the end surfaces 41 and 42 to be flat surfaces. At this time, a load was applied with a flat plate surface or the like such that the active material non-covered portions on the end surfaces 41 and 42 were bent and overlapped each other toward the central axis. Thereafter, the plate-shaped portion 31 of the positive electrode current collector plate 24 was laser-welded to the end surface 41, and the plate-shaped portion 33 of the negative electrode current collector plate 25 was laser-welded to the end surface 42 and joined.

Thereafter, as shown in FIG. 4D, the strip-shaped portions 32 and 34 of the current collector plates 24 and 25 were bent, the insulating plates 12 and 13 (or insulating tapes) were attached to the positive electrode current collector plate 24 and the negative electrode current collector plate 25, and the electrode winding body 20 assembled as described above was inserted into the battery can 11 shown in FIG. 4E to weld the bottom of the battery can 11. After the electrolytic solution was injected into the battery can 11, sealing was performed with the gasket 15 and the battery lid 14 as shown in FIG. 4F.

EXAMPLES

Hereinafter, the present application will be described based on Examples in which a perforated area ratio and the internal resistance of the battery are compared using the lithium ion battery 1 produced as described above. The present application is not limited to Examples described herein.

Figure 5:
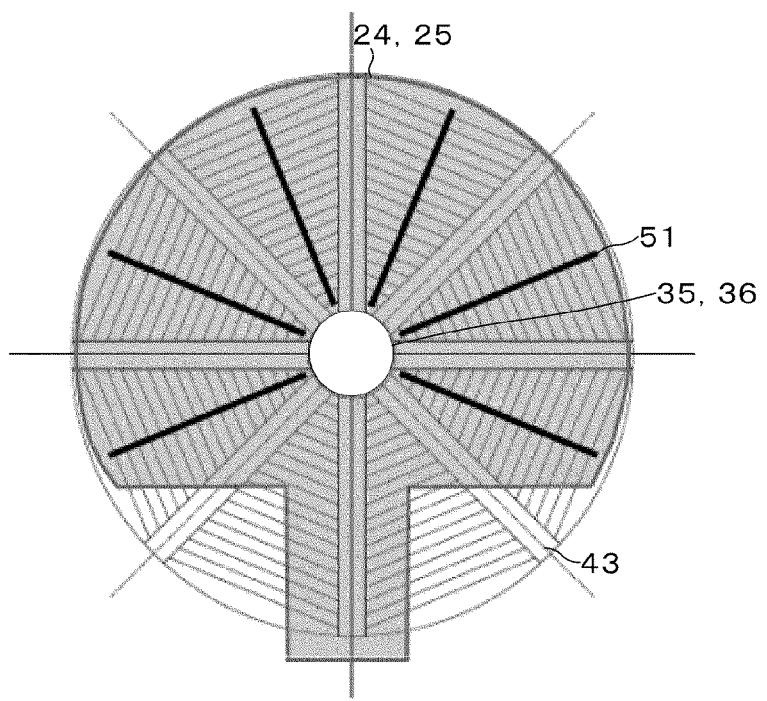
FIG. 5 is a view for explaining a position of a laser welding mark.

In all of the following Examples and Comparative Examples, a battery size was 21700 (diameter: 21 mm, length: 70 mm), the number of grooves 43 was eight, and the grooves 43 were arranged at substantially equal angular intervals. The joining of the positive electrode current collector plate 24 and the active material non-covered portion 21C of the positive electrode and the joining of the negative electrode current collector plate 25 and the active material non-covered portion 22C of the negative electrode were performed by laser welding in the arrangement as shown in FIG. 5. FIG. 5 is a schematic view illustrating an end surface and a groove of a winding body through a current collector plate in a see-through manner in order to describe a position of a laser welding mark. A portion indicated by a black thick solid line portion in FIG. 5 is a laser welding mark 51. The laser welding marks 51 were arranged linearly at substantially equal angular intervals from the vicinity of the holes 35 and 36 to an outer peripheral portion one by one between the grooves 43 adjacent to each other. As shown in FIG. 5, the six laser welding marks 51 were arranged at portions covered by the current collector plates 24 and 25, and a length of each of the laser welding marks 51 was 6 mm.

Hereinafter, a width of the laser welding mark 51 on a surface of the positive electrode current collector plate 24, which does not face the electrode winding body, is referred to as a bead width of the positive electrode, a width of the laser welding mark 51 on a surface of the negative electrode current collector plate 25, which does not face the electrode winding body, is referred to as a bead width of the negative electrode, and when the bead width of the positive electrode and the bead width of the negative electrode are not distinguished from each other, the bead width is referred to as the bead width. The bead width was determined from the results of observing the laser welding marks 51 on the surfaces of the positive electrode current collector plate 24 and the negative electrode current collector plate 25 with an optical microscope. Laser welding was performed using a fiber laser (wavelength: 1070±10 nm). The fiber laser can reduce a diameter of a focal point as compared with a general YAG laser, and therefore, is suitable for applications in which metal foils such as the active material non-covered portion of the positive electrode and the active material covered portion of the negative electrode are reliably welded. When laser welding was performed, the bead width was adjusted by changing welding conditions such as a welding output value, a sweep speed, and a focal length.

Figure 6:
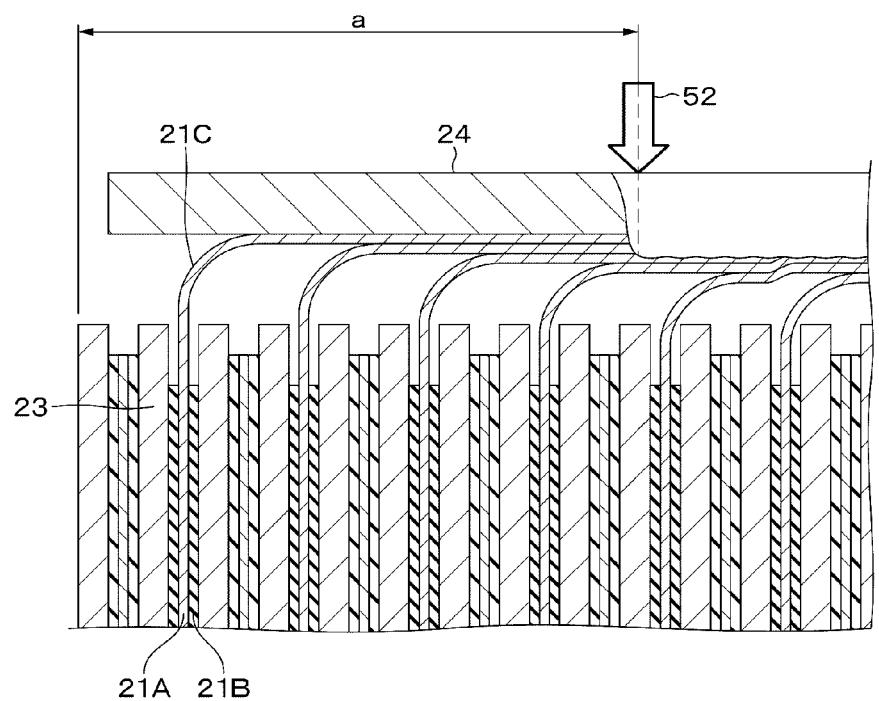
FIG. 6 is a view for explaining the number of active material non-covered portions overlapping.

FIG. 6 schematically illustrates a state of a cross section of the active material non-covered portion 21C of the positive electrode and the laser welding mark 51 of the positive electrode current collector plate 24. In the end surface 41, welding was performed by applying laser light 52 in a predetermined range from a point at a distance a from a side surface of the electrode winding body 20. The number m of the active material non-covered portions overlapping on the positive electrode side is the number of the active material non-covered portions 21C (positive electrode foil) welded immediately below the point at the distance a in FIG. 6. The point at the distance a is a point farthest from the central axis in a trajectory formed by the laser light 52. By cutting the battery along a plane parallel to the central axis and observing a welded portion, the number of the active material non-covered portions overlapping can be confirmed. A view of a laser welding state between the active material non-covered portion 22C of the negative electrode and the negative electrode current collector plate 25 is omitted. The number n of the active material non-covered portions overlapping on the negative electrode side is the number of the active material non-covered portions 22C (negative electrode foil) welded immediately below the point at the distance a. The numbers m and n of the active material non-covered portions overlapping were adjusted by changing a length C of a portion where the active material non-covered portion 21C of the positive electrode in FIG. 2 protruded from one end in the width direction of the separator 23 and a length D of a portion where the active material non-covered portion 22C of the negative electrode protruded from the other end in the width direction of the separator 23, and changing the welding conditions.

Example 1

The bead width of the positive electrode was 0.10 mm, a thickness of the positive electrode current collector plate 24 was 0.15 mm, a thickness of the active material non-covered portion 21C of the positive electrode was 10 µm, the number m of the active material non-covered portions overlapping on the positive electrode side was 3, the bead width of the negative electrode was 0.06 mm, a thickness of the negative electrode current collector plate was 0.08 mm, a thickness of the active material non-covered portion of the negative electrode was 10 µm, and the number n of the active material non-covered portions overlapping on the negative electrode side was 2.

Example 2

The bead width of the positive electrode was 0.05 mm, the thickness of the positive electrode current collector plate 24 was 0.15 mm, the thickness of the active material non-covered portion 21C of the positive electrode was 10 µm, the number m of the active material non-covered portions overlapping on the positive electrode side was 2, the bead width of the negative electrode was 0.03 mm, the thickness of the negative electrode current collector plate 25 was 0.08 mm, the thickness of the active material non-covered portion 22C of the negative electrode was 10 µm, and the number n of the active material non-covered portions overlapping on the negative electrode side was 2.

Example 3

The bead width of the positive electrode was 0.18 mm, the thickness of the positive electrode current collector plate 24 was 0.15 mm, the thickness of the active material non-covered portion 21C of the positive electrode was 10 µm, the number m of the active material non-covered portions overlapping on the positive electrode side was 2, the bead width of the negative electrode was 0.12 mm, the thickness of the negative electrode current collector plate 25 was 0.08 mm, the thickness of the active material non-covered portion 22C of the negative electrode was 10 µm, and the number n of the active material non-covered portions overlapping on the negative electrode side was 2.

Example 4

The bead width of the positive electrode was 0.10 mm, the thickness of the positive electrode current collector plate 24 was 0.07 mm, the thickness of the active material non-covered portion 21C of the positive electrode was 10 µm, the number m of the active material non-covered portions overlapping on the positive electrode side was 2, the bead width of the negative electrode was 0.06 mm, the thickness of the negative electrode current collector plate 25 was 0.05 mm, the thickness of the active material non-covered portion 22C of the negative electrode was 10 µm, and the number n of the active material non-covered portions overlapping on the negative electrode side was 2.

Example 5

The bead width of the positive electrode was 0.10 mm, the thickness of the positive electrode current collector plate 24 was 0.20 mm, the thickness of the active material non-covered portion 21C of the positive electrode was 10 µm, the number m of the active material non-covered portions overlapping on the positive electrode side was 2, the bead width of the negative electrode was 0.06 mm, the thickness of the negative electrode current collector plate 25 was 0.15 mm, the thickness of the active material non-covered portion 22C of the negative electrode was 10 µm, and the number n of the active material non-covered portions overlapping on the negative electrode side was 2.

Example 6

The bead width of the positive electrode was 0.10 mm, the thickness of the positive electrode current collector plate 24 was 0.15 mm, the thickness of the active material non-covered portion 21C of the positive electrode was 5 µm, the number m of the active material non-covered portions overlapping on the positive electrode side was 2, the bead width of the negative electrode was 0.06 mm, the thickness of the negative electrode current collector plate 25 was 0.08 mm, the thickness of the active material non-covered portion 22C of the negative electrode was 6 µm, and the number n of the active material non-covered portions overlapping on the negative electrode side was 2.

Example 7

The bead width of the positive electrode was 0.10 mm, the thickness of the positive electrode current collector plate 24 was 0.15 mm, the thickness of the active material non-covered portion 21C of the positive electrode was 20 µm, the number m of the active material non-covered portions overlapping on the positive electrode side was 2, the bead width of the negative electrode was 0.06 mm, the thickness of the negative electrode current collector plate 25 was 0.08 mm, the thickness of the active material non-covered portion 22C of the negative electrode was 20 µm, and the number n of the active material non-covered portions overlapping on the negative electrode side was 2.

Example 8

The bead width of the positive electrode was 0.18 mm, the thickness of the positive electrode current collector plate 24 was 0.12 mm, the thickness of the active material non-covered portion 21C of the positive electrode was 15 µm, the number m of the active material non-covered portions overlapping on the positive electrode side was 2, the bead width of the negative electrode was 0.10 mm, the thickness of the negative electrode current collector plate 25 was 0.07 mm, the thickness of the active material non-covered portion 22C of the negative electrode was 12 µm, and the number n of the active material non-covered portions overlapping on the negative electrode side was 3.

Example 9

The bead width of the positive electrode was 0.05 mm, the thickness of the positive electrode current collector plate 24 was 0.07 mm, the thickness of the active material non-covered portion 21C of the positive electrode was 12 µm, the number m of the active material non-covered portions overlapping on the positive electrode side was 2, the bead width of the negative electrode was 0.03 mm, the thickness of the negative electrode current collector plate 25 was 0.05 mm, the thickness of the active material non-covered portion 22C of the negative electrode was 8 µm, and the number n of the active material non-covered portions overlapping on the negative electrode side was 3.

Comparative Example 1

The bead width of the positive electrode was 0.10 mm, the thickness of the positive electrode current collector plate 24 was 0.15 mm, the thickness of the active material non-covered portion 21C of the positive electrode was 10 µm, the number m of the active material non-covered portions overlapping on the positive electrode side was 1, the bead width of the negative electrode was 0.10 mm, the thickness of the negative electrode current collector plate 25 was 0.08 mm, the thickness of the active material non-covered portion 22C of the negative electrode was 10 µm, and the number n of the active material non-covered portions overlapping on the negative electrode side was 1.

Comparative Example 2

The bead width of the positive electrode was 0.25 mm, the thickness of the positive electrode current collector plate 24 was 0.15 mm, the thickness of the active material non-covered portion 21C of the positive electrode was 10 µm, the number m of the active material non-covered portions overlapping on the positive electrode side was 2, the bead width of the negative electrode was 0.21 mm, the thickness of the negative electrode current collector plate 25 was 0.08 mm, the thickness of the active material non-covered portion 22C of the negative electrode was 10 µm, and the number n of the active material non-covered portions overlapping on the negative electrode side was 3.

Comparative Example 3

The bead width of the positive electrode was 0.46 mm, the thickness of the positive electrode current collector plate 24 was 0.15 mm, the thickness of the active material non-covered portion 21C of the positive electrode was 10 µm, the number m of the active material non-covered portions overlapping on the positive electrode side was 3, the bead width of the negative electrode was 0.41 mm, the thickness of the negative electrode current collector plate 25 was 0.08 mm, the thickness of the active material non-covered portion 22C of the negative electrode was 10 µm, and the number n of the active material non-covered portions overlapping on the negative electrode side was 2.

Comparative Example 4

The bead width of the positive electrode was 0.69 mm, the thickness of the positive electrode current collector plate 24 was 0.15 mm, the thickness of the active material non-covered portion 21C of the positive electrode was 10 µm, the number m of the active material non-covered portions overlapping on the positive electrode side was 2, the bead width of the negative electrode was 0.63 mm, the thickness of the negative electrode current collector plate 25 was 0.08 mm, the thickness of the active material non-covered portion 22C of the negative electrode was 10 µm, and the number n of the active material non-covered portions overlapping on the negative electrode side was 3.

Comparative Example 5

The bead width of the positive electrode was 1.20 mm, the thickness of the positive electrode current collector plate 24 was 0.15 mm, the thickness of the active material non-covered portion 21C of the positive electrode was 10 µm, the number m of the active material non-covered portions overlapping on the positive electrode side was 2, the bead width of the negative electrode was 0.80 mm, the thickness of the negative electrode current collector plate 25 was 0.08 mm, the thickness of the active material non-covered portion 22C of the negative electrode was 10 µm, and the number n of the active material non-covered portions overlapping on the negative electrode side was 2.

Comparative Example 6

The bead width of the positive electrode was 0.40 mm, the thickness of the positive electrode current collector plate 24 was 0.25 mm, the thickness of the active material non-covered portion 21C of the positive electrode was 10 µm, the number m of the active material non-covered portions overlapping on the positive electrode side was 2, the bead width of the negative electrode was 0.38 mm, the thickness of the negative electrode current collector plate 25 was 0.20 mm, the thickness of the active material non-covered portion 22C of the negative electrode was 10 µm, and the number n of the active material non-covered portions overlapping on the negative electrode side was 2.

Comparative Example 7

The bead width of the positive electrode was 0.10 mm, the thickness of the positive electrode current collector plate 24 was 0.15 mm, the thickness of the active material non-covered portion 21C of the positive electrode was 30 µm, the number m of the active material non-covered portions overlapping on the positive electrode side was 3, the bead width of the negative electrode was 0.06 mm, the thickness of the negative electrode current collector plate 25 was 0.08 mm, the thickness of the active material non-covered portion 22C of the negative electrode was 30 µm, and the number n of the active material non-covered portions overlapping on the negative electrode side was 2.

Comparative Example 8

The bead width of the positive electrode was 0.10 mm, the thickness of the positive electrode current collector plate 24 was 0.05 mm, the thickness of the active material non-covered portion 21C of the positive electrode was 10 μm, the number m of the active material non-covered portions overlapping on the positive electrode side was 2, the bead width of the negative electrode was 0.06 mm, the thickness of the negative electrode current collector plate 25 was 0.03 mm, the thickness of the active material non-covered portion 22C of the negative electrode was 10 μm, and the number n of the active material non-covered portions overlapping on the negative electrode side was 2.

Comparative Example 9

The bead width of the positive electrode was 0.02 mm, the thickness of the positive electrode current collector plate 24 was 0.15 mm, the thickness of the active material non-covered portion 21C of the positive electrode was 10 μm, the number m of the active material non-covered portions overlapping on the positive electrode side was 0, the bead width of the negative electrode was 0.02 mm, the thickness of the negative electrode current collector plate 25 was 0.08 mm, the thickness of the active material non-covered portion 22C of the negative electrode was 10 μm, and the number n of the active material non-covered portions overlapping on the negative electrode side was 0.

For the above Examples and Comparative Examples, the perforated area ratio, the internal resistance of the battery, and the number of the active material non-covered portions overlapping were determined. After the laser welding was performed, the current collector plate was observed using a microscope (laser microscope VK-X series manufactured by KEYENCE CORPORATION) to determine an area (that is, a product of the bead width, a welding length of 6 mm, and the number of welds of 6, and an area including the perforated area) of the entire laser welding mark 51. Next, area of all portions where formation of the through hole was recognized were added up to be taken as the perforated area, and a ratio (%) to the area of the entire laser welding mark 51 was calculated. The perforated area ratio obtained from the result of laser welding of the positive electrode current collector plate 24 and the active material non-covered portion 21C of the positive electrode is referred to as the perforated area ratio of the positive electrode, and the perforated area ratio obtained from the result of laser welding of the negative electrode current collector plate 25 and the active material non-covered portion 22C of the negative electrode is referred to as the perforated area ratio of the negative electrode.

The internal resistance of the battery is a value of direct current resistance (DCR), and is obtained by calculating a slope of a voltage value when a discharge current is increased from 0 A to 100 A in 5 seconds. An example in which the internal resistance of the battery was 10.5 mΩ or less was determined as OK, and an example in which the internal resistance was more than 10.5 mΩ was determined as NG. The results are shown in Table 1.

TABLE 1

| | Bead width of positive electrode (mm) | Thickness of positive electrode current collector plate (mm) | Thickness of active material non-covered portion of positive electrode (μm) | Number m of overlapping on positive electrode side | Perforated area ratio of positive electrode (%) | Bead width of negative electrode (mm) |
|---|---|---|---|---|---|---|
| Example 1 | 0.10 | 0.15 | 10 | 3 | 0 | 0.06 |
| Example 2 | 0.05 | 0.15 | 10 | 2 | 0 | 0.03 |
| Example 3 | 0.18 | 0.15 | 10 | 2 | 0 | 0.12 |
| Example 4 | 0.10 | 0.07 | 10 | 2 | 0 | 0.06 |
| Example 5 | 0.10 | 0.20 | 10 | 2 | 0 | 0.06 |
| Example 6 | 0.10 | 0.15 | 5 | 2 | 0 | 0.06 |
| Example 7 | 0.10 | 0.15 | 20 | 2 | 0 | 0.06 |
| Example 8 | 0.18 | 0.12 | 15 | 2 | 0 | 0.10 |
| Example 9 | 0.05 | 0.07 | 12 | 2 | 0 | 0.03 |
| Comparative Example 1 | 0.10 | 0.15 | 10 | 1 | 38 | 0.10 |
| Comparative Example 2 | 0.25 | 0.15 | 10 | 2 | 26 | 0.21 |
| Comparative Example 3 | 0.46 | 0.15 | 10 | 3 | 36 | 0.41 |
| Comparative Example 4 | 0.69 | 0.15 | 10 | 2 | 49 | 0.63 |
| Comparative Example 5 | 1.20 | 0.15 | 10 | 2 | 40 | 0.80 |
| Comparative Example 6 | 0.40 | 0.25 | 10 | 2 | 22 | 0.38 |
| Comparative Example 7 | 0.10 | 0.15 | 30 | 3 | 44 | 0.06 |

TABLE 1-continued

| | | | | | | |
|---|---|---|---|---|---|---|
| Comparative Example 8 | 0.10 | 0.05 | 10 | 2 | 0 | 0.06 |
| Comparative Example 9 | 0.02 | 0.15 | 10 | 0 | 0 | 0.02 |

| | Thickness of negative electrode current collector plate (mm) | Thickness of active material non-covered portion of negative electrode (μm) | Number n of overlapping on negative electrode side | Perforated area ratio of negative electrode (%) | Internal resistance of battery (mΩ) | Determination |
|---|---|---|---|---|---|---|
| Example 1 | 0.08 | 10 | 2 | 0 | 9.06 | OK |
| Example 2 | 0.08 | 10 | 2 | 0 | 9.24 | OK |
| Example 3 | 0.08 | 10 | 2 | 0 | 8.91 | OK |
| Example 4 | 0.05 | 10 | 2 | 0 | 9.55 | OK |
| Example 5 | 0.15 | 10 | 2 | 0 | 8.86 | OK |
| Example 6 | 0.08 | 6 | 2 | 0 | 9.10 | OK |
| Example 7 | 0.08 | 20 | 2 | 0 | 9.23 | OK |
| Example 8 | 0.07 | 12 | 3 | 0 | 9.36 | OK |
| Example 9 | 0.05 | 8 | 3 | 0 | 10.28 | OK |
| Comparative Example 1 | 0.08 | 10 | 1 | 24 | 12.90 | NG |
| Comparative Example 2 | 0.08 | 10 | 3 | 17 | 10.62 | NG |
| Comparative Example 3 | 0.08 | 10 | 2 | 27 | 11.55 | NG |
| Comparative Example 4 | 0.08 | 10 | 3 | 33 | 15.34 | NG |
| Comparative Example 5 | 0.08 | 10 | 2 | 39 | 20.18 | NG |
| Comparative Example 6 | 0.20 | 10 | 2 | 34 | 13.84 | NG |
| Comparative Example 7 | 0.08 | 30 | 2 | 62 | 10.96 | NG |
| Comparative Example 8 | 0.03 | 10 | 2 | 0 | 12.44 | NG |
| Comparative Example 9 | 0.08 | 10 | 0 | 0 | 25.12 | NG |

In Examples 1 to 9, the perforated area ratio of the positive electrode and the perforated area ratio of the negative electrode were 0%, and the internal resistance of the battery was 10.5 mΩ or less (determination was OK), whereas in Comparative Examples 1 to 7, the perforated area ratio of the positive electrode and the perforated area ratio of the negative electrode were not 0%, and the internal resistance of the battery was more than 10.5 mΩ (determination was NG). In Comparative Examples 8 and 9, although the perforated area ratio was 0%, the internal resistance of the battery was larger than 10.5 mΩ (determination was NG).

Figure 7:
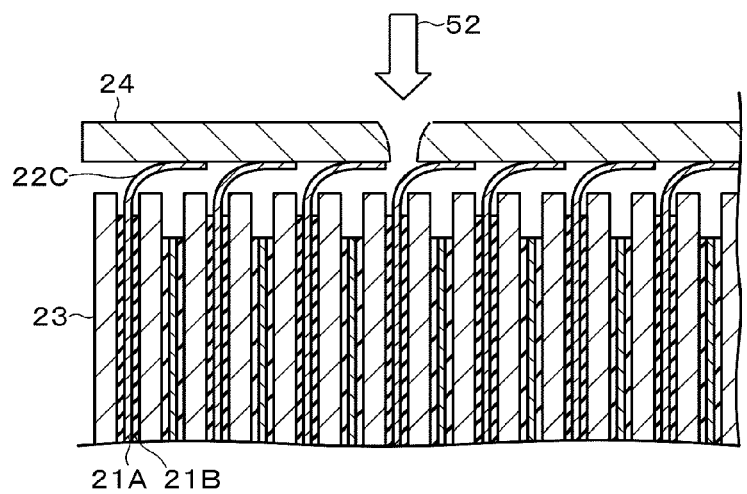
FIG. 7 is a view for explaining Comparative Example 1.
Figure 8:
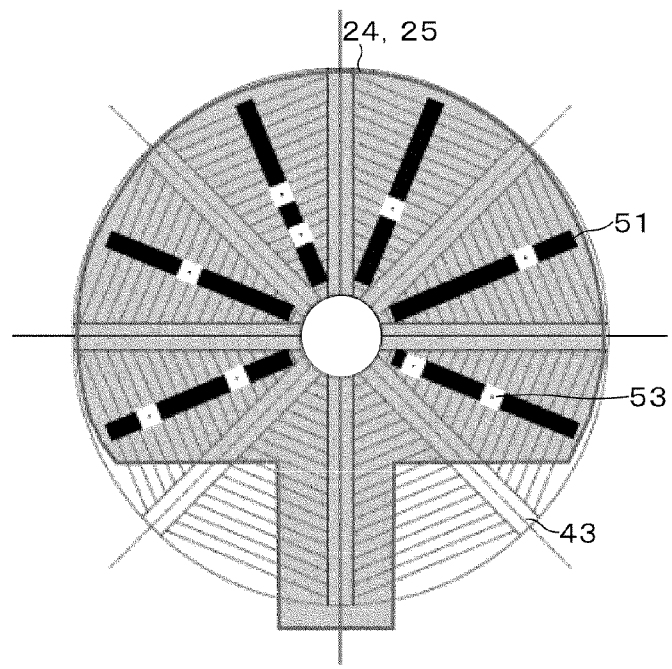
FIG. 8 is a view for explaining Comparative Examples 2 to 6.

In Comparative Example 1, as shown in FIG. 7, the number of the active material non-covered portions overlapping is 1, and there is a gap between the bent active material non-covered portions 21C and 22C, so that it is considered that perforation or sputtering has occurred. In Comparative Examples 2 to 6, as shown in FIG. 8, perforation 53 occurred. FIG. 8 is a schematic view illustrating the end surface and the groove of the winding body through the current collector plate in a see-through manner in order to describe the position of the laser welding mark. A portion indicated by a black thick solid line portion in FIG. 8 is the laser welding mark 51, and a white portion is a portion of the perforation 53 formed by laser welding. This is considered to be because welding energy is too large. In Comparative Example 7, the perforation 53 occurred as a result of laser welding. This is considered to be because the thicknesses of the active material non-covered portions 21C and 22C are too large. In Comparative Example 8, although the perforated area ratio of the positive electrode and the perforated area ratio of the negative electrode were 0%, the internal resistance of the battery was larger than 10.5 mΩ. This is considered to be because the thicknesses of the current collector plates 24 and 25 are relatively small. In Comparative Example 9, although laser welding was attempted, welding was not performed. This is considered to be because the welding energy is relatively small.

In Examples 1 to 9, laser welding was successful. In Examples 1 to 9, the bead width of the positive electrode was 0.05 mm or more and 0.18 mm or less, the thickness of the positive electrode current collector plate 24 was 0.07 mm or more and 0.20 mm or less, the bead width of the negative electrode was 0.03 mm or more and 0.12 mm or less, the thickness of the negative electrode current collector plate 25 was 0.05 mm or more and 0.15 mm or less, and the number m of the active material non-covered portions overlapping on the positive electrode side and the number n of the active material non-covered portions overlapping on the negative electrode side were each 2 or more. In Examples 1 to 9, the thickness of the active material non-covered portion 21C of the positive electrode was 5 μm or more and 20 μm or less, and the thickness of the active material non-covered portion 22C of the negative electrode was 6 μm or more and 20 μm or less. At this time, all the internal resistances of the battery 1 were 10.5 mΩ or less.

The present application has been described above; however, the contents of the present application are not limited thereto, and various modifications of the present application can be made.

Figure 9:
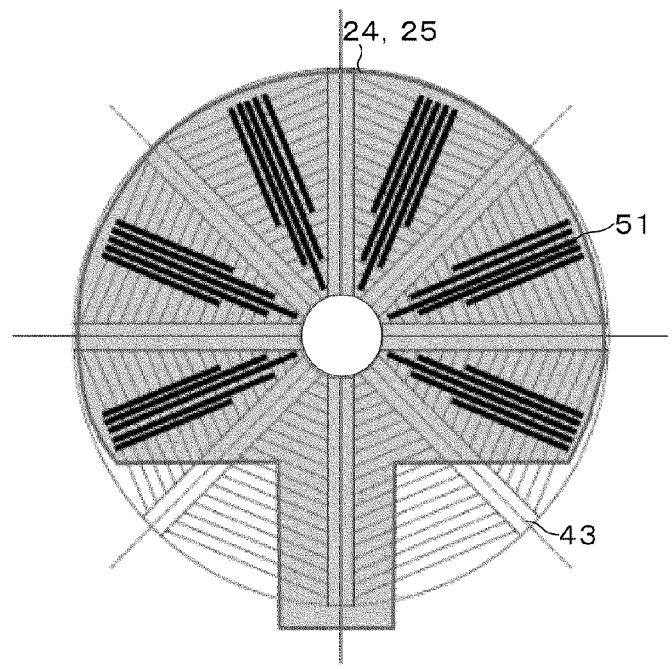
FIG. 9 is view for explaining a modification.

In an embodiment, one laser welding mark is disposed between the adjacent grooves 43 as shown in FIG. 5; however, a plurality of laser welding marks may be arranged between the adjacent grooves 43 as shown in FIG. 9. FIG. 9 is a schematic view illustrating the end surface and the groove of the winding body through the current collector plate in a see-through manner in order to describe the position of the laser welding mark. A portion indicated by a black thick solid line portion in FIG. 8 is the laser welding mark 51. In this case, since an area of the laser welding mark is further increased, the internal resistance of the battery is further reduced.

In Examples and Comparative Examples, the number of the grooves 43 was set to 8, but other numbers may be used.

The battery size is 21700 (diameter: 21 mm, height: 70 mm), but may be 18650 (diameter: 18 mm, height: 65 mm) or another size.

The positive electrode current collector plate 24 and the negative electrode current collector plate 25 include the plate-shaped portions 31 and 33 having a fan shape, but may have other shapes.

The present technology can also be applied to other batteries other than the lithium ion battery and batteries having a shape other than a cylindrical shape (for example, a laminate-type battery, a square-type battery, a coin-type battery, and a button-type battery). In this case, the shape of the "end surface of the electrode winding body" may be not only a cylindrical shape but also an elliptical shape, a flat shape, or the like.

Figure 10:
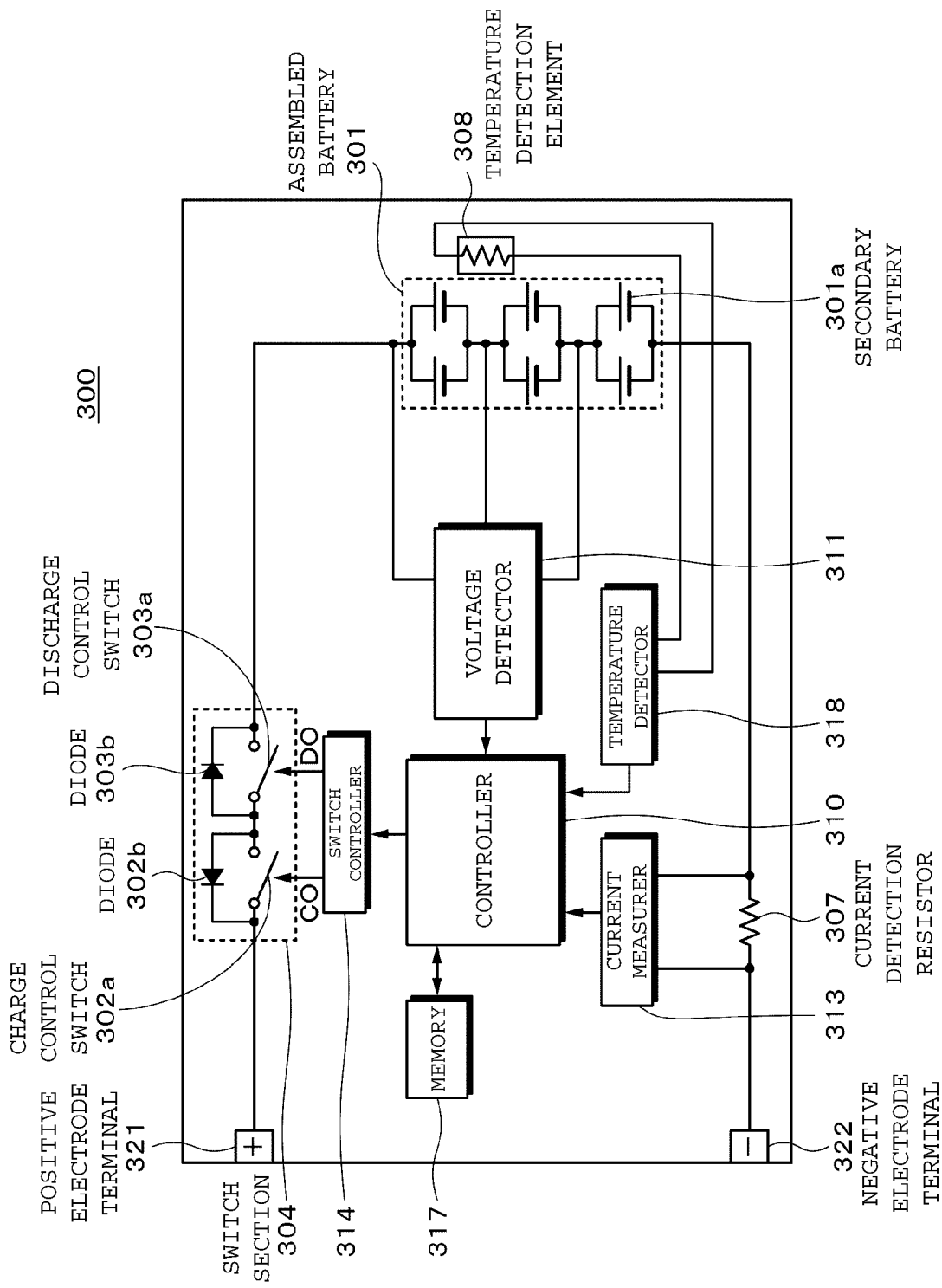
FIG. 10 is a connection diagram used for describing a battery pack as an application example of the present application.

FIG. 10 is a block diagram showing a circuit configuration example in a case where the battery 1 is applied to a battery pack 300 according to an embodiment. The battery pack 300 includes an assembled battery 301, a switch section 304 including a charge control switch 302*a* and a discharge control switch 303*a*, a current detection resistor 307, a temperature detection element 308, and a controller 310. The controller 310 can control each device, further perform charge and discharge control at the time of abnormal heat generation, and calculate and correct a remaining capacity of the battery pack 300. A positive electrode terminal 321 and a negative electrode terminal 322 of the battery pack 300 are connected to a charger or an electronic device, and are charged and discharged.

The assembled battery 301 is formed by connecting a plurality of secondary batteries 301*a* to each other in series and/or in parallel. FIG. 10 shows, as an example, a case where the six secondary batteries 301*a* are connected to each other in 2 parallel 3 series (2P3S).

The temperature detector 318 is connected to a temperature detection element 308 (for example, a thermistor), measures the temperature of the assembled battery 301 or the battery pack 300, and supplies the measured temperature to the controller 310. A voltage detector 311 measures the voltage of the assembled battery 301 and the respective secondary batteries 301*a* configuring the assembled battery and performs A/D conversion of this measured voltage to supply the resulting voltage to the controller 310. A current measurer 313 measures the current by using the current detection resistor 307 and supplies this measured current to the controller 310.

A switch controller 314 controls the charge control switch 302*a* and the discharge control switch 303*a* of the switch section 304 based on the voltage and the current input from the voltage detector 311 and the current measurer 313. The switch controller 314 prevents overcharge and overdischarge by sending an OFF control signal to the switch section 304 when the voltage of the secondary battery 301*a* has become equal to or higher than an overcharge detection voltage (for example, 4.20 V±0.05 V) or equal to or lower than an overdischarge detection voltage (2.4 V±0.1 V).

After the charge control switch 302*a* or the discharge control switch 303*a* is turned off, charging or discharging can be performed only through a diode 302*b* or a diode 303*b*. As these charge/discharge switches, a semiconductor switch such as a MOSFET can be used. In FIG. 10, the switch section 304 is provided on a plus (+) side, but may be provided on a minus (−) side.

The memory 317 includes a RAM and a ROM, and stores and rewrites a value of the battery characteristics calculated by the controller 310, a full charge capacity, the remaining capacity, and the like.

The battery 1 can be mounted on a device such as an electronic device, an electric transportation device, or a power storage device, and can be used for supplying electric power according to an embodiment.

Examples of the electronic device include notebook personal computers, smartphones, tablet terminals, PDAs (personal digital assistants), mobile phones, wearable terminals, digital still cameras, electronic books, music players, game machines, hearing aids, power tools, televisions, lighting devices, toys, medical devices, and robots. In addition, electric transportation devices, power storage devices, power tools, and electric unmanned aerial vehicles to be described later can also be included in the electronic device in a broad sense.

Examples of the electric transportation device include electric vehicles (including hybrid vehicles), electric motorcycles, electric assisted bicycles, electric buses, electric carts, automatic guided vehicles (AGV), and railway vehicles. In addition, electric passenger aircrafts and electric unmanned aircrafts for transportation are also included. The secondary battery according to the present application is used not only as these driving power supplies but also as an auxiliary power supply, a power supply for recovering a regenerated energy, and other power supplies.

Examples of the power storage device include power storage modules for commercial use or household use, and power supplies for electric power storage use for a building such as a house, a building, or an office, or for a power-generating facility.

Figure 11:
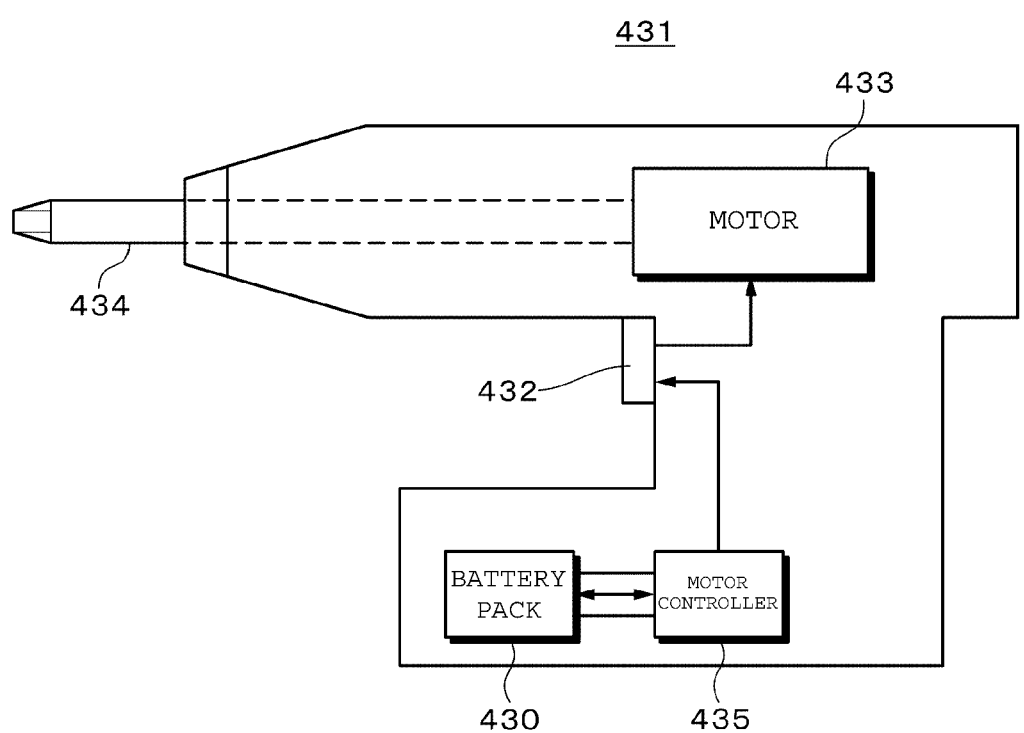
FIG. 11 is a connection diagram used for describing a power tool as an application example of the present application.

An example of an electric driver as a power tool to which the present technology can be applied will be schematically described with reference to FIG. 11 according to an embodiment. An electric driver 431 is provided with a motor 433 that transmits rotational power to a shaft 434 and a trigger switch 432 operated by a user. A battery pack 430 and a motor controller 435 according to an embodiment are housed in a lower housing of a handle of the electric driver 431. The battery pack 430 is built in the electric driver 431 or is detachable. The battery 1 of the present application can be applied to a battery constituting the battery pack 430 according to an embodiment.

Each of the battery pack 430 and the motor controller 435 may be provided with a microcomputer (not shown) so that charge/discharge information of the battery pack 430 can be communicated with each other. The motor controller 435 can control operation of the motor 433 and cut off power supply to the motor 433 at the time of abnormality such as overdischarge.

Figure 12:
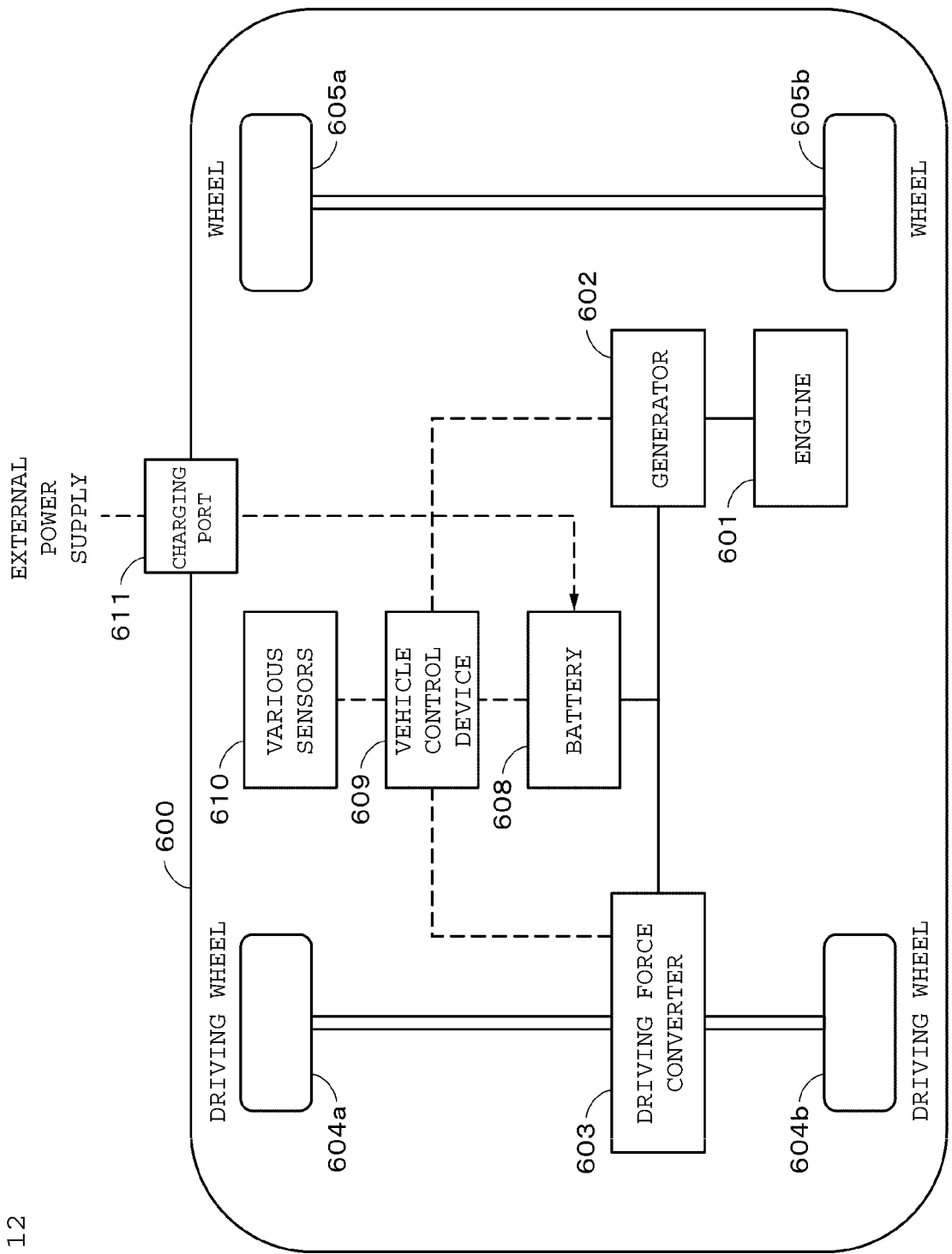
FIG. 12 is a connection diagram used for describing an electric vehicle as an application example of the present application.

As an example in which the present application is applied to an electric vehicle power storage system, FIG. 12 schematically shows a configuration example of a hybrid vehicle (HV) employing a series hybrid system. The series hybrid system is a car travelling with an electric power driving force converter using electric power generated by a generator powered by an engine or electric power obtained by temporarily storing the generated electric power in a battery.

An engine 601, a generator 602, an electric power driving force converter 603 (DC motor or AC motor, hereinafter, it is simply referred to as the "motor 603"), a driving wheel 604a, a driving wheel 604b, a wheel 605a, a wheel 605b, a battery 608, a vehicle control device 609, various sensors 610, and a charging port 611 are mounted in a hybrid vehicle 600 as described above. As the battery 608, the battery pack 300 or a power storage module on which a plurality of the batteries 1 are mounted can be applied according to an embodiment.

The motor 603 is operated by the electric power of the battery 608, and a rotating force of the motor 603 is transmitted to the driving wheels 604a and 604b. The electric power generated by the generator 602 can be stored in the battery 608 by the rotating force generated by the engine 601. The various sensors 610 control an engine speed through the vehicle control device 609, or control an opening degree of a throttle valve (not shown).

When the hybrid vehicle 600 is decelerated by a brake mechanism (not shown), a resistance force during the deceleration is added as a rotating force to the motor 603, and regenerative electric power generated due to this rotating force is stored in the battery 608. The battery 608 can be charged by being connected to an external power supply via the charging port 611 of the hybrid vehicle 600. Such an HV vehicle is referred to as a plug-in hybrid vehicle (PHV or PHEV).

The secondary battery according to the present technology can also be applied to a downsized primary battery and used as a power supply of a tire pressure monitoring system (TPMS) built in wheels 604 and 605.

Although a series hybrid vehicle has been described above as an example, the present technology is also applicable to a parallel system using an engine and a motor together or a hybrid vehicle in which a series system and a parallel system are combined. In addition, the present technology is also applicable to an electric vehicle (EV or BEV) and a fuel cell vehicle (FCV) that travel only by a drive motor not using an engine.

DESCRIPTION OF REFERENCE SYMBOLS

1: Lithium ion battery
12: Insulating plate
21: Positive electrode
21A: Positive electrode foil
21B: Positive electrode active material covered portion
21C: Active material non-covered portion of positive electrode
22: Negative electrode
22A: Negative electrode foil
22B: Negative electrode active material covered portion
22C: Active material non-covered portion of negative electrode
23: Separator
24: Positive electrode current collector plate
25: Negative electrode current collector plate
26: Through hole
27, 28: Outer edge portion
41, 42: End surface
43: Groove
51: Laser welding mark It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
an electrode winding body having a structure in which a strip-shaped positive electrode and a strip-shaped negative electrode are stacked with a separator interposed therebetween and wound around a central axis, a positive electrode current collector plate, and a negative electrode current collector plate are housed in a battery can,
the positive electrode having a positive electrode active material covered portion covered with a positive electrode active material layer and a positive electrode active material non-covered portion on a strip-shaped positive electrode foil,
the negative electrode having a negative electrode active material covered portion covered with a negative electrode active material layer and a negative electrode active material non-covered portion on a strip-shaped negative electrode foil,
the positive electrode active material non-covered portion being joined to the positive electrode current collector plate at one end portion of the electrode winding body,
the negative electrode active material non-covered portion being joined to the negative electrode current collector plate at the other end portion of the electrode winding body,
the electrode winding body having a flat surface formed by bending any one or both of the positive electrode active material non-covered portion and the negative electrode active material non-covered portion toward a central axis of the wound structure and overlapping the positive electrode active material non-covered portion and the negative electrode active material non-covered portion, and a groove formed in the flat surface,
a region other than the groove in the flat surface is joined to the positive electrode current collector plate, the negative electrode current collector plate, or both,
the positive electrode current collector plate having a positive electrode bead on a surface thereof, the negative electrode current collector plate having a negative electrode bead on a surface thereof,
a width of the positive electrode bead being 0.05 mm or more and 0.18 mm or less, a width of the negative electrode bead being 0.03 mm or more and 0.12 mm or less,
a thickness of the positive electrode current collector plate being 0.07 mm or more and 0.20 mm or less, a thickness of the negative electrode current collector plate being 0.05 mm or more and 0.15 mm or less,
a thickness of the positive electrode active material non-covered portion being 5 μm or more and 20 μm or less, a thickness of the negative electrode active material non-covered portion being 6 μm or more and 20 μm or less, and
the positive electrode active material non-covered portion includes two or more positive electrode active material non-covered portions overlapping on a positive electrode side, and the negative electrode active material non-covered portion includes two or more negative electrode active material non-covered portions overlapping on a negative electrode side.

2. The secondary battery according to claim 1, wherein a material of the positive electrode current collector plate includes aluminum or an aluminum alloy.

3. The secondary battery according to claim 1, wherein a material of the negative electrode current collector plate includes a simple substance or a composite (clad material) of nickel, a nickel alloy, copper, or a copper alloy.

4. An electronic device comprising the secondary battery according to claim 1.

5. A power tool comprising the secondary battery according to claim 1.

* * * * *